Dec. 28, 1965    C. E. GUTSHALL    3,225,808
LOCK NUT
Filed Jan. 15, 1964    2 Sheets-Sheet 1
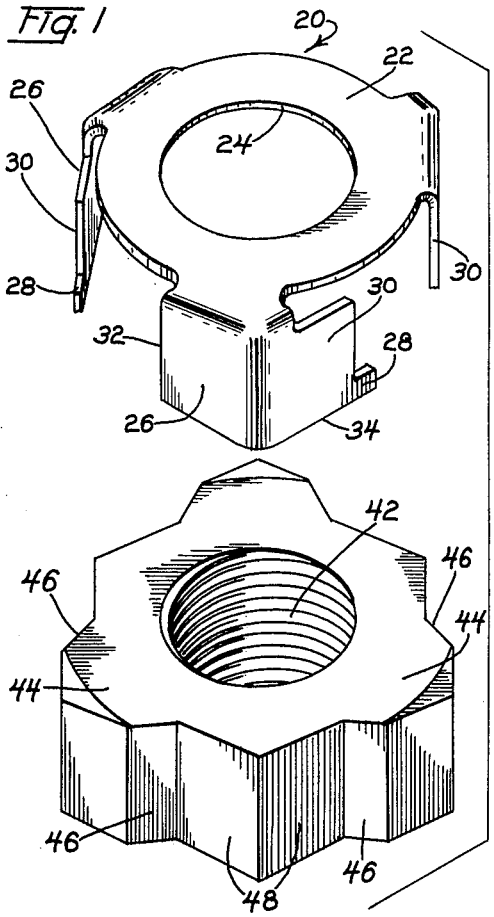
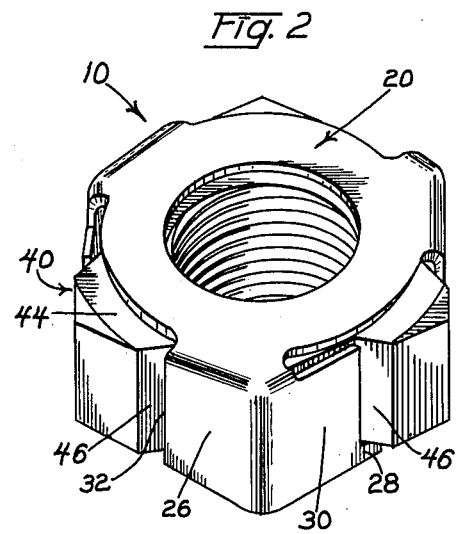
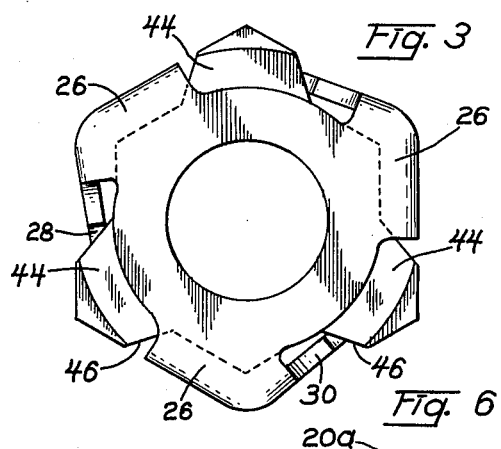
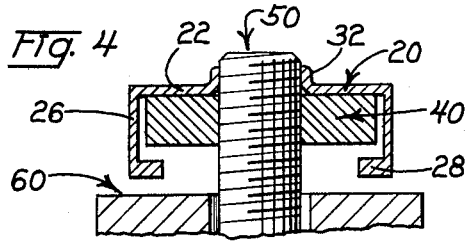
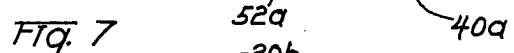
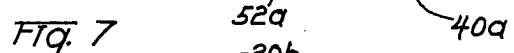
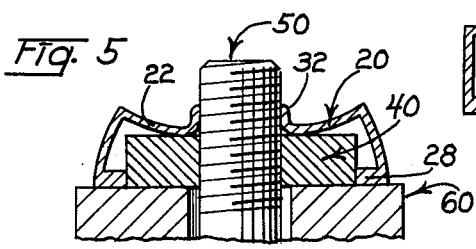
INVENTOR.
Charles E. Gutshall
BY Robert W. Beart
His Att'y Dec. 28, 1965 C. E. GUTSHALL 3,225,808
LOCK NUT
Filed Jan. 15, 1964 2 Sheets-Sheet 2
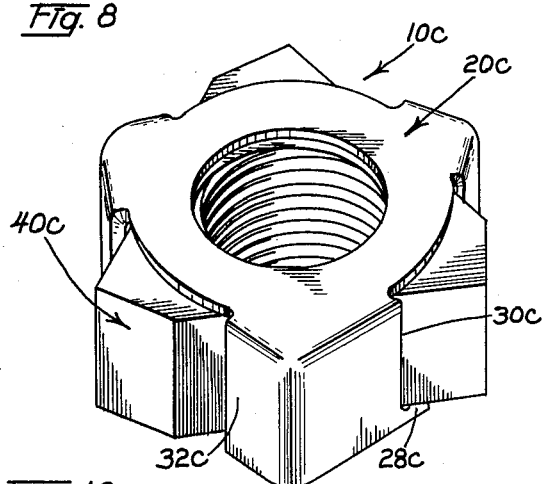
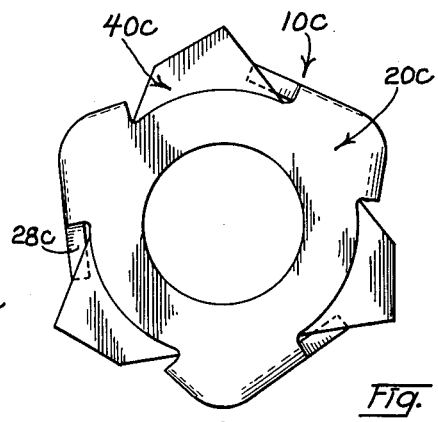
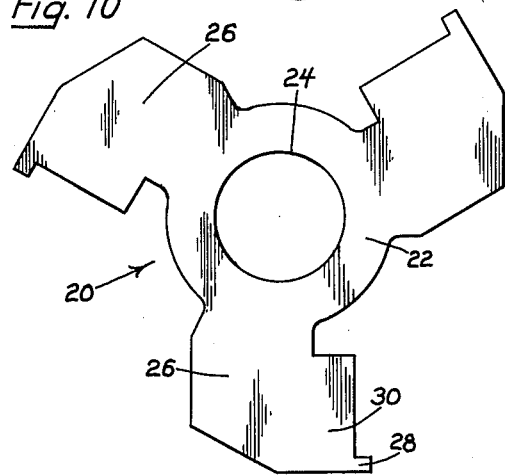
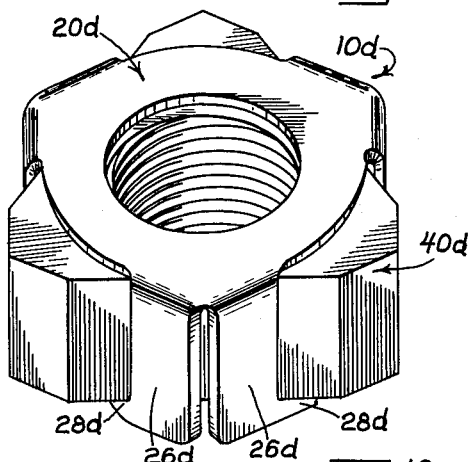
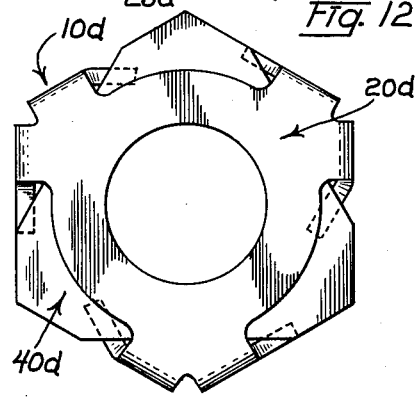
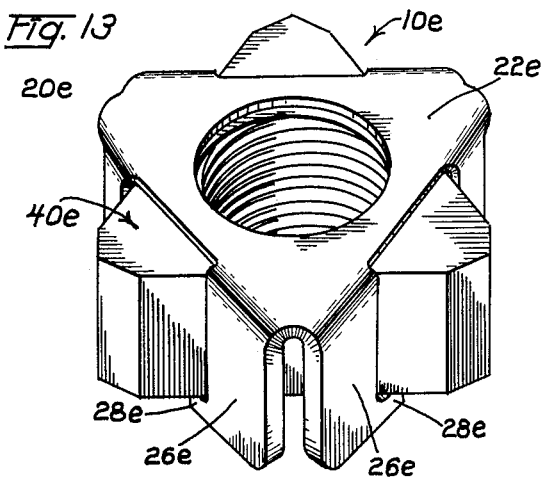
INVENTOR.
Charles E. Gutshall
BY
His Att'y United States Patent Office 3,225,808
Patented Dec. 28, 1965

3,225,808
LOCK NUT
Charles E. Gutshall, Roselle, Ill., assignor to Illinois Tool Works Inc., Chicago, Ill., a corporation of Delaware
Filed Jan. 15, 1964, Ser. No. 337,944
6 Claims. (Cl. 151—15)

The present invention relates to a nut locking device, and more particularly to a composite or two piece lock nut composed of a pair of superimposed triangular shaped members which form a generally hexagonal exterior configuration.

Nuts have been made from either rigid or flexible material, but rarely has it ever been attempted to make a composite nut body made from both rigid and flexible material. In U.S. Patent No. 1,787,114, there is disclosed a composite nut having a heavy inner nut member which supports an encircling sheet metal nut member so as to increase the number of wrench engaging portions and provide a fine degree of adjustment. Such a construction does not take full advantage of the heavier inner nut member since only the sheet metal nut member will be engaged by a tool or wrench. As a result, the sheet metal member will be deformed out of shape when a certain amount of torque is applied thereto.

It is, therefore, an object of the present invention to provide a composite nut made from rigid and flexible material parts which utilizes the wrench engaging portions of both parts.

Another object of the present invention is the provision of a composite lock nut wherein the association of the rigid and flexible nut members is such as to provide an ordinary free running nut when tightened by a wrench, and prevent initial engagement of the wrench with the flexible material part when the nut is loosened to avoid destruction or mutilation thereof.

A still further object of the present invention is to provide a two piece nut of the above-described type which can be made in standard dimensions, and which is economical to make on existing equipment.

Nut devices are also preferably provided with means to resist unauthorized retrograde movement thereof. While this concept is per se old, the present invention contemplates a nut lock which operates in a novel and unique manner.

Accordingly, it is another object of the present invention to provide a nut of the above-described type which supplies its own lock against unauthorized loosening or removal.

A still further object of the present invention is the provision of a flexible nut member which is superimposed upon and detachably held to a rigid inner nut member until the nut members are forced against a complementary workpiece where the flexible nut member acts to supply a spring lock against the rigid inner nut member and prevent unauthorized removal thereof.

More specifically, it is an object of the present invention to cause the flexible nut member to lock the rigid inner nut member against removal by engagement with the top surface of the rigid inner nut member and a complementary work surface.

Other objects and advantages will become more apparent from the following description when taken in conjunction with the accompanying drawings wherein:

FIG. 1 is an exploded view of the rigid and flexible nut members prior to assembly thereof;

FIG. 2 is a perspective view of the composite lock nut incorporating features of the present invention;

FIG. 3 is a top plan view of the composite lock nut shown in FIG. 2;

FIG. 4 is a diagrammatic view, partially in section, showing the composite lock nut as associated with a complementary threaded male member;

FIG. 5 is a diagrammatic view similar to FIG. 4, and showing the flexible body member engaging a complementary work surface so as to supply a spring lock against the rigid nut member;

FIG. 6 is a diagrammatic sectional view of a modified form of composite lock nut;

FIG. 7 is a diagrammatic sectional view showing yet another modified form of composite lock nut;

FIG. 8 is a perspective view showing a composite lock nut having a modified form of rigid nut member;

FIG. 9 is a top plan view of the composite lock nut shown in FIG. 8;

FIG. 10 is a top plan view of the flexible nut member blank prior to the bending thereof to the configuration shown in FIG. 1;

FIG. 11 is a perspective view of a composite lock nut having a modified form of flexible nut member;

FIG. 12 is a top plan view of the composite lock nut shown in FIG. 11;

FIG. 13 is a perspective view of a composite lock nut having yet another modified form of flexible nut member.

Referring now to the drawings wherein like numerals are used throughout the various figures to designate the same parts, there is shown in FIG. 2 a composite lock nut 10 of preferred form. The lock nut generally comprises a flexible nut member 20 which is adapted to be superimposed on a rigid nut member 40 as best seen in FIG. 1, and nonrotatively secured thereto.

While the composite lock nut is preferably made of metal, it is to be understood that plastic or other suitable material or a combination of metal or plastic, etc., may be used. When made of metal, the rigid nut member is made from bar stock while the flexible nut member is made from sheet material.

The flexible nut member 20 is provided with an annular body portion 22 having an inner peripheral wall 24 which is adapted to be coextensively threaded with respect to the rigid body member 40 for purposes to be described hereinafter. Extending from the outer periphery of the annular body portion 22 are a plurality of peripherally spaced, axially extending flanges 26 which are adapted to be received over portions of the outer periphery of the rigid nut member 40. Each flange has an outer convex surface so as to provide a wrench engaging portion for the application of wrenching torque thereto, a projection or shoulder 28 which is adapted to engage the undersurface of the rigid nut member 40, and an upstanding abutment 30 which is adapted to engage side wall surfaces of the rigid nut member. The flexible nut member may be struck or otherwise formed from sheet metal in the form of the blank shown in FIG. 10 and then bent to the configuration referred to above.

In applying the flexible nut member 20 to the rigid nut member 40, the flanges 26, with their wrench engaging portions, are adapted to be positioned intermediate the wrench engaging portions 44 of the rigid nut member. When the nut members are associated in this manner, the inner periphery 24 of the annular body portion 22 will be aligned with the threaded inner peripheral wall 42 of the rigid nut member 40. The shoulders or projections 28 of each flange are then bent or deflected so as to rest beneath and engage the undersurface of the rigid body member. It is in this assembled condition that both the rigid and flexible nut members are preferably threaded together so that the helical thread convolutions of the lock nut are substantially continuous throughout both the nut members. Threading the flexible nut member need not be accomplished since the rigid nut member will provide sufficient threaded engagement with a threaded male member.

In the positioning of the flanges 26 and their associated wrench engaging portions intermediate the wrench engaging portions 44 of the rigid nut member, it will be observed that the flanges 26 will overlie side wall surfaces 48 which have less radial extent than the wrench engaging portions 44. To enhance the wrench engaging capacity of the flanges 26, it will be noted that the upstanding abutment 30 and end surface 32 of each of the flanges are adapted to engage surfaces 46 of the rigid wrench engaging portions 44 to rigidify the flanges. The engagement of the upstanding abutment 30 and end surface 32 with the surfaces 46 also acts to prevent relative rotation between the rigid and flexible nut members when secured to one another.

Once the nut members are assembled to one another, it will be observed that the exterior configuration of the lock nut is generally hexagonal in shape due to the substantially triangular shape of both the nut members. Other shapes for the body members may be employed to increase or reduce the number of possible wrench engaging portions for the lock nut. In any event, the significant aspect of the present invention is that the alternating sequence of the rigid and flexible wrench engaging portions provides a lock nut which is capable of having relatively high wrenching torque applied thereto without having any substantially noticeable destruction or mutilation of the flexible wrench engaging portions. The lateral and underlying support given to the flexible flanges 26 by the side wall surfaces 46, 48 also aids in preventing deformation of the flexible wrench engaging portions.

When the assembly of the rigid and flexible nut members has been completed, the lock nut is then ready for use with a threaded male or stud member 50 for numerous applications such as securing parts together, etc. The lock nut can be simply applied to a rotary threaded stud member and rotated with respect thereto until it comes into engagement with a complementary work surface. Teeth may be provided on the lower edge of the flanges 26 to aid in preventing relative rotation between the two nut members.

Another form of composite lock nut is shown in FIGS. 4–5 wherein the flexible flanges 26 have an axial length greater than that of the rigid nut member 40. Wrenching torque applied to the nut will rotate the nut relative to the threaded male member 50 until the flanges 26 come into engagement with the complementary work surface 60. At this point, the flanges 26 will be forced radially outwardly due to the angular deflection of the annular body portion 22. The upward movement of the annular body portion in the vicinity of its outer periphery will force the flanges outwardly in the manner aforementioned until the shoulders or projections 28 are forced outside of the outer periphery of the rigid nut body, thereby causing the inner peripheral margins of the annular body portion 22 to bear against the top surface of the rigid nut member. Subsequent tightening of the lock nut to cause the rigid nut member to bear against the complementary work surface, will in turn cause the deflected flanges to exert a downward force against the rigid nut member in the vicinity of the inner peripheral margins of the annular body portion 22 and prevent unauthorized loosening of the lock nut. Thus, it will be seen that the lock nut supplies its own spring lock to prevent unauthorized retrograde movement when the nut members are tightened against a complementary work surface.

To prevent the separation of the nut members when the flanges are deflected in the manner discussed above, the annular body portion 22 is preferably, though not necessarily, provided with an upstanding annular member 32 having a plurality of helical thread convolutions lying coextensive to and mating with the helical thread convolutions of the rigid nut member. The deflection of the flanges 26 will also exert a force against the lower end of the upstanding annular member 32 in a substantially radial direction so as to cause the deformation of the wall of the upstanding annular member and prevent the stripping of threads formed on the inner peripheral wall thereof.

The design of the flexible and rigid wrench engaging portions will permit the application of the nut as any ordinary free running nut. However, it is to be noted that the portion of the flanges containing the shoulder 28 and abutment 30 devitaes from the general hexagonal outline and lies within the border thereof. When a wrench socket or the like is thus applied to the lock nut for removal thereof, it will be evident that the wrench will initially engage only the rigid wrench engaging portions and permit the flexible wrench engaging portions to avoid the high torque force required for removal. Additionally, the nut will then assume a prevailing torque aspect since the rigid nut member must turn against the deflected flexible nut member. Even after contact with the work surface is lost, the rigid nut member must turn against the flexible nut member which is in threaded engagement with the stud member. This latter result shows that the design of the flexible and wrench engaging portions is such as to permit usage with any of the nut locks contemplated by this invention.

Another way of insuring that unauthorized loosening of the nut members will be prevented is shown by the modified form of the invention illustrated in FIG. 6. The rigid nut member 40a of the composite lock nut 10a is shown here as being generally associated with a washer 52a having deflectable teeth on its outer periphery. Tightening of the lock nut against a complementary work surface will thus cause the deflectable teeth to exert a force against the rigid and flexible nut members which locks the threads thereof against the threads of the threaded male member.

FIG. 7 shows another modified form of composite lock nut identified as 10d wherein the rigid nut member 40b has an arched configuration so as to maintain its own tension, which in turn may be additionally maintained by a flexible nut member having flanges of greater axial length than that of the rigid nut member such as that shown in FIGS. 4–5. The reactionary force applied to the lock nut by the arched rigid nut member 40b will prevent unauthorized removal of the lock nut from a threaded stud member due to the diagonal bearing force applied to the threads of the lock nut and stud member by nut member 40b.

Another modified form of rigid nut member is shown in FIGS. 8–9 wherein the lock nut 10c is provided with a rigid nut member 40c having only six peripheral side faces as distinguished from the multi-faced rigid nut member shown in FIGS. 1–3. In this instance, the flanges 26 rest against flat side faces of the nut and the upstanding abutment 30a and end surface 32a engage such surfaces to prevent relative rotation between the two nut members.

The flanges 26d of the modified lock nut 10d shown in FIGS. 11–12 may be bifurcated so as to provide a pair of leg portions each having means 28d for engaging the undersurface of the rigid nut member 40d. This construction provides twice as many engagement points for the attachment of the flexible nut member with the rigid nut member to securely hold the nut members together.

A still further modified form of the invention is shown in FIG. 13 wherein the annular body portion of the previous embodiments may be substantially triangular in shape to readily provide a plurality of angularly offset wrench engaging portions 26e. It will also be observed that the flanges 26e are bifurcated so that each leg portion formed thereby will lie substantially in the same plane with a leg portion of an adjacent flange. If desired, the projections or shoulders 28e of the leg portions lying within the same plane may be integrally joined to one another to encase the rigid nut member 40e within the flexible nut member 20e. This assures that the leg portions will not separate from the rigid nut member when the lock nut is tightened against a complementary work surface.

From the foregoing, it will be appreciated that the present invention contemplates a composite lock nut having flexible and rigid nut members, the flexible nut member adapted to be superimposed on the rigid nut member so as to provide alternate rigid and flexible wrench engaging portions. An additional aspect of the invention relates to the novel constructions of either the flexible or rigid nut member which yieldably holds the nut lock against a complementary work surface and prevents unauthorized retograde movement thereof.

While the preferred embodiments of the present invention have been shown and described herein, it is obvious that many structural details may be changed without departing from the spirit and scope of the appended claims.

I claim:

1. A composite lock nut for use with a complementary threaded stud member comprising a rigid body member having a central threaded aperture and transverse end faces and being provided with a plurality of peripherally spaced wrench engaging portions and with a plurality of portions each being intermediate said wrench engaging portions and projecting radially outwardly less than said wrench engaging portions, said flexible body member having an angular body and a plurality of downward depending peripherally spaced flanges and being superimposed and assembled with said rigid body member said flanges being of greater axial length than that of said rigid body member, said annular body overlying a transverse face of said rigid body to assure alignment of said annular body with said central threaded aperture in said rigid body member, said depending flanges having an angular configuration and disposed intermediate said wrench engaging portions of said rigid body member thereby providing wrench engaging portions alternately disposed with said wrench engaging portions of said rigid body member and preventing relative rotation between said rigid body and said flexible body, said angular configuration of said flanges effecting substantially a continuation of said wrench engaging portions of said rigid body member whereby both said portions may be simultaneously engaged by a wrench for torque carrying purposes, said depending flanges having means remote from the end adjacent said annular body for engaging the undersurface of said rigid body member for detachably securing said flexible body member thereto.

2. A composite lock nut for use with a complementary threaded stud member comprising a rigid body member having a central threaded aperture and transverse end faces and being provided with a plurality of peripherally spaced wrench engaging portions and with a plurality of portions each being intermediate said wrench engaging portions and projecting radially outwardly less than said wrench engaging portions, said flexible body member having an annular body and a plurality of downward depending peripherally spaced flanges and being superimposed and assembled with said rigid body member, said flanges being of greater axial length than that of said rigid body member, said annular body overlying a transverse face of said rigid body to assure alignment of said annular body with said central threaded aperture in said rigid body member, said depending flanges having an angular configuration and disposed intermediate said wrench engaging portions of said rigid body member thereby providing wrench engaging portions of said rigid body member and preventing relative rotation between said rigid body and said flexible body, said angular configuration of said flanges effecting substantially a continuation of said wrench engaging portions of said rigid body member whereby both said portions may be simultaneously engaged by a wrench for torque carrying purposes, said depending flanges having means remote from the end adjacent said annular body for engaging the undersurface of said rigid body member for detachably securing said flexible body member thereto, said flanges adapted to disengage the means engaging the undersurface of said rigid body member whereby said annular body of said flexible body member is deflected against the top surface of said rigid body member to prevent unauthorized loosening thereof.

3. The lock nut as defined in claim 2 wherein each of said flanges of said flexible body member are provided with means for engaging a complementary work surface to resist rotation of said flexible body member, the flanges of said flexible body member adapted to abut against the wrench engaging portions of said rigid body member to prevent rotation thereof.

4. The lock nut as defined in claim 2 wherein said rigid body member has an arched configuration to provide a diagonal bearing force against the threads of said rigid body and stud member to prevent unauthorized loosening of said rigid and flexible body members from said stud member.

5. The lock nut as defined in claim 2 wherein said rigid body member is interconnected to a washer having deflectable teeth at its outer periphery, the deflectable teeth of said washer adapted to engage a complementary work surface and prevent unauthorized retrograde movement of said rigid and flexible body members.

6. The lock nut as defined in claim 2 wherein each of said flanges of said flexible body member are bifurcated to provide a pair of leg portions, each of said leg portions having means thereon for engaging the undersurface of said rigid body member to secure said flexible body member thereto.

References Cited by the Examiner

UNITED STATES PATENTS

| | | | |
|---|---|---|---|
| 916,351 | 3/1909 | Miller | 151—30 |
| 1,046,483 | 12/1912 | Mummelthey | 151—15 |
| 1,394,741 | 10/1921 | Klocke | 151—38 |
| 1,774,081 | 8/1930 | Burns. | |
| 2,379,980 | 7/1945 | Miller | 151—15 |
| 2,564,645 | 8/1951 | Johnson | 151—15 |
| 2,616,474 | 11/1952 | Healy | 151—7 |
| 2,695,046 | 11/1954 | Tinnerman | 151—30 |
| 2,702,063 | 2/1955 | Poupitch | 151—37 |
| 2,758,627 | 8/1956 | Randall. | |

CARL W. TOMLIN, *Primary Examiner.*

M. PARSONS, JR., *Assistant Examiner.*